US012728593B2

(12) United States Patent
Wycoff et al.

(10) Patent No.: US 12,728,593 B2
(45) Date of Patent: Sep. 8, 2026

(54) FUSING AGENTS WITH TRIAZINE RADIATION ABSORBERS FOR THREE-DIMENSIONAL PRINTING

(71) Applicant: PERIDOT PRINT LLC, Palo Alto, CA (US)

(72) Inventors: Kyle Wycoff, Palo Alto, CA (US); Adekunle Olubummo, Palo Alto, CA (US); Krzysztof Nauka, Palo Alto, CA (US); Aja Hartman, Palo Alto, CA (US); Michelle Niu, Palo Alto, CA (US); Emre Hiro Discekici, San Diego, CA (US)

(73) Assignee: Peridot Print LLC, Palo Alto, CA (US)

( * ) Notice: Subject to any disclaimer, the term of this patent is extended or adjusted under 35 U.S.C. 154(b) by 135 days.

(21) Appl. No.: 18/571,707

(22) PCT Filed: Jun. 24, 2021

(86) PCT No.: PCT/US2021/038798
§ 371 (c)(1),
(2) Date: Dec. 18, 2023

(87) PCT Pub. No.: WO2022/271174
PCT Pub. Date: Dec. 29, 2022

(65) Prior Publication Data

US 2024/0286344 A1 Aug. 29, 2024

(51) Int. Cl.
*B29C 64/165* (2017.01)
*B29C 64/188* (2017.01)
(Continued)

(52) U.S. Cl.
CPC .......... *B29C 64/165* (2017.08); *B29C 64/188* (2017.08); *B29C 64/264* (2017.08);
(Continued)

(58) Field of Classification Search
CPC .. B29C 64/165; C07D 201/16; C07D 201/18; C07D 521/24
See application file for complete search history.

(56) References Cited

U.S. PATENT DOCUMENTS 10,913,205 B2 2/2021 Feng et al.
2005/0129632 A1* 6/2005 Haase .................. A61K 8/4966 424/59
(Continued)

FOREIGN PATENT DOCUMENTS

JP 5350013 B2 11/2013
KR 101002866 B1 * 12/2010 ............. A61K 8/064
(Continued)

OTHER PUBLICATIONS

Machine translation of KR 101002866 (2010, 10 pages).*

*Primary Examiner* — Brieann R Johnston
(74) *Attorney, Agent, or Firm* — Dierker & Kavanaugh, P.C.

(57) ABSTRACT

A fusing agent for three-dimensional printing can include from about 0.5 wt % to about 6 wt % triazine radiation absorber; from about 40 wt % to about 90 wt % organic cosolvent; from about 0.4 wt % to about 4 wt % of a surfactant selected from a polyethylene sorbitol ester, a polyoxyethylene lauryl ether, or a mixture thereof; and water.

20 Claims, 3 Drawing Sheets

(51) Int. Cl.

| | |
|---|---|
| ***B29C 64/264*** | (2017.01) |
| ***B29K 21/00*** | (2006.01) |
| ***B29K 77/00*** | (2006.01) |
| ***B29K 105/00*** | (2006.01) |
| ***B33Y 10/00*** | (2015.01) |
| ***B33Y 30/00*** | (2015.01) |
| ***B33Y 70/00*** | (2020.01) |
| ***C08K 5/3492*** | (2006.01) |

(52) U.S. Cl.

CPC ............... *B33Y 10/00* (2014.12); *B33Y 30/00* (2014.12); *B33Y 70/00* (2014.12); *C08K 5/3492* (2013.01); *B29K 2021/003* (2013.01); *B29K 2077/00* (2013.01); *B29K 2105/251* (2013.01); *B29K 2995/002* (2013.01); *B29K 2995/0026* (2013.01); *B29K 2995/0029* (2013.01)

(56) References Cited

U.S. PATENT DOCUMENTS

| | | | | |
|---|---|---|---|---|
| 2012/0321576 | A1* | 12/2012 | Sugiyama ................ | A61K 8/37<br>424/59 |
| 2019/0001557 | A1 | 1/2019 | Smith, III | |
| 2019/0054690 | A1* | 2/2019 | Feng ...................... | B33Y 40/10 |
| 2020/0299459 | A1* | 9/2020 | Ehlis ...................... | A61K 8/496 |

FOREIGN PATENT DOCUMENTS

| | | | |
|---|---|---|---|
| WO | 2017/069778 | A1 | 4/2017 |
| WO | 2020/251528 | A1 | 12/2020 |

* cited by examiner

400 iteratively applying individual build material layers of a polymer build material including from about 80 wt% to 100 wt% polymeric particles having a D50 particle size from about 10 µm to about 150 µm to a powder bed

410 based on a three-dimensional object model, iteratively and selectively dispensing a fusing agent onto the individual build material layers, wherein the fusing agent includes from about 0.5 wt% to about 20 wt% triazine radiation absorber solubilized in a liquid vehicle

420 iteratively exposing the powder bed to light energy having a peak wavelength from about 340 nm to about 415 nm at an energy level from about 2 $W/cm^2$ to about 50 $W/cm^2$ for a time duration of about 0.05 second to about 10 seconds to selectively fuse the polymeric particles in contact with the triazine radiation absorber at the individual build material layers resulting in a fused three-dimensional object

FUSING AGENTS WITH TRIAZINE RADIATION ABSORBERS FOR THREE-DIMENSIONAL PRINTING

BACKGROUND

Methods of three-dimensional (3 digital printing, a type of additive manufacturing, have continued to be developed over the last few decades. In general, three-dimensional printing technology can change the product development cycle by allowing rapid creation of prototype models or even finished products. For example, several commercial sectors such as aviation and the medical industry, to name a few, have benefitted from rapid prototyping and/or the production of customized parts. There are various methods for three-dimensional printing that have been developed, including heat-assisted extrusion, selective laser sintering, photolithography, additive manufacturing, as well as others. As technology advances, higher demands with respect to production speed, part consistency, rigidity, method flexibility, etc., are requested by customers.

BRIEF DESCRIPTION OF THE DRAWINGS

FIG. 4 is a flow diagram illustrating an example method for three-dimensional printing in accordance with the present disclosure.

DETAILED DESCRIPTION

Figure 1:
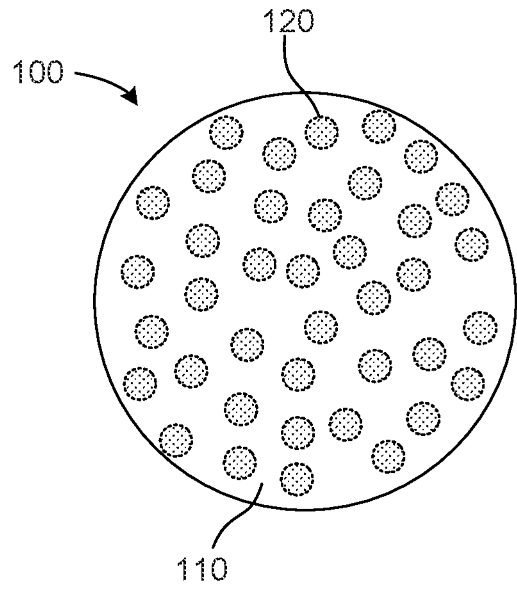
FIG. 1 schematically illustrates an example fusing agent in accordance with the present disclosure.

The present disclosure is drawn to fusing agents for three-dimensional (3D) printing, as well as systems and methods for three-dimensional printing. More particularly, the fusing agents and the three-dimensional printing systems and methods can be used with multi-jet fusion (MJF) where polymeric particles of a build material can be spread on a powder bed on a layer-by-layer basis. The various layers can be selectively contacted with jetting fluid(s) which can include a radiation absorber. The jetting fluid(s) can be ejected from a print head, such as a fluid ejector similar to an inkjet print head, for example, and then the layer can be exposed to electromagnetic radiation to heat the layer of the build material. The radiation absorber can absorb the electromagnetic radiation and emit heat to the surrounding polymeric particles thereby fusing the adjacent polymeric particles to one another. This can be repeated layer-by-layer until a three-dimensional object is formed.

In accordance with this, the present disclosure is drawn to a fusing agent for three-dimensional printing can include from about 0.5 wt % to about 6 wt % triazine radiation absorber; from about 40 wt % to about 90 wt % organic cosolvent; from about 0.4 wt % to about 4 wt % of a surfactant selected from a polyethylene sorbitol ester, a polyoxyethylene lauryl ether, or a mixture thereof; and water. The polyethylene sorbitol ester can be present in one example in the form of polyoxyethylene-sorbitan-20 monooleate, polysorbate 80 or in another example in the form of polyoxyethylene (23) lauryl ether, e.g. BRIJ® 23 from Sigma-Aldrich. In some examples, the fusing agent can exhibit an absorbance from about 0.3 to 2 at a wavelength from about 340 nm to about 400 nm. The triazine radiation absorber can be a triazine derivative compound selected from 2,4-bis(2,4-dimethylphenyl)-6-(2-hydroxy-4-octyloxyphenyl)-1,3,5-triazine, 2,4-bis(2,4-dimethylphenyl)-6-(2-hydroxy-4-isooctyloxyphenyl)-1,3,5-triazine, 2,4-bis(2,4-dimethyl phenyl)-6-(2-hydroxy-4-methoxy phenyl)1,3,5-triazine, 2-(2-hydroxy-4-hexyloxyphenyl)-4,6-bis(phenyl)-1,3,5-triazine, 2-(2-hydroxy-4-methoxyphenyl)-4,6-bis(phenyl)-1,3,5-triazine, 2,4-bis(2-hydroxy-4-methoxyphenyl)-6-ethyl mercaptan-1,3,5-triazine, and 2,2'-[6-(4-methoxyphenyl)-1,3,5-triazine-2,4-diyl]bis{5-[(2-ethylhexyl)oxy]phenol}, or a combination thereof.

A three-dimensional printing system can include a build material including from about 80 wt % to 100 wt % polymeric particles having a D50 particle size from about 10 μm to about 150 μm, and a fusing agent including from about 0.5 wt % to about 20 wt % triazine radiation absorber solubilized in a liquid vehicle. The fusing agent can exhibit an absorbance from about 0.3 to 2 at a wavelength from about 300 nm to about 500 nm. The triazine radiation absorber can be a triazine derivative compound selected from 2,4-bis(2,4-dimethylphenyl)-6-(2-hydroxy-4-octyloxyphenyl)-1,3,5-triazine, 2,4-bis(2,4-dimethylphenyl)-6-(2-hydroxy-4-isooctyloxyphenyl)-1,3,5-triazine, 2,4-bis(2,4-dimethyl phenyl)-6-(2-hydroxy-4-methoxy phenyl)1,3,5-triazine, 2-(2-hydroxy-4-hexyloxyphenyl)-4,6-bis(phenyl)-1,3,5-triazine, 2-(2-hydroxy-4-methoxyphenyl)-4,6-bis(phenyl)-1,3,5-triazine, 2,4-bis(2-hydroxy-4-methoxyphenyl)-6-ethyl mercaptan-1,3,5-triazine, and 2,2'-[6-(4-methoxyphenyl)-1,3,5-triazine-2,4-diyl]bis{5-[(2-ethylhexyl)oxy]phenol}, or a combination thereof. In some examples, the polymeric particles are white, transparent, or translucent. In other examples, the polymeric particles can include polyacetal, polyacrylate, polyamide, polybutylene, polybutylene terephthalate, polycarbonate, polyester, polyether ketone, polyethylene terephthalate, polyethylene, polypropylene, polystyrene, polyurethane, thermoplastic polyamide, thermoplastic polyurethane, or a combination thereof. The three-dimensional printing system can further include a second fluid agent selected from a coloring agent with a liquid vehicle and a colorant, and/or can further include a detailing agent that includes a detailing compound that reduces a temperature of the build material onto which the detailing agent is applied. The three-dimensional printing system can also include a fluid ejector loaded or loadable with the fusing agent to eject the fusing agent onto a powder bed of the build material. The system can also include a UV energy source that emits a peak wavelength from about from about 340 nm to about 415 nm at an energy level from about 2 $W/cm^2$ to about 50 $W/cm^2$.

A method of three-dimensional printing can include iteratively applying individual build material layers of a polymer build material including from about 80 wt % to 100 wt % polymeric particles having a D50 particle size from about 10 μm to about 150 μm to a powder bed; and based on a three-dimensional object model, iteratively and selectively dispensing a fusing agent onto the individual build material layers, wherein the fusing agent includes from about 0.5 wt % to about 20 wt % triazine radiation absorber solubilized in a liquid vehicle. The method can also include iteratively exposing the powder bed to light energy having a peak wavelength from about 340 nm to about 415 nm at an energy level from about 2 $W/cm^2$ to about 50 $W/cm^2$ for a time duration of about 0.05 second to about 10 seconds to selectively fuse the polymeric particles in contact with the triazine radiation absorber at the individual build material layers resulting in a fused three-dimensional object. In one example, the fused three-dimensional object that is formed can be white, transparent, or translucent. In further detail, in another example, based on the three-dimensional object model, the method can further include iteratively applying a second fluid agent to individual build material layers, wherein the second fluid agent is selected from a coloring agent that includes a liquid vehicle and a colorant, or a detailing agent that includes a detailing compound that reduces a temperature of the build material onto which the detailing agent is applied.

A three-dimensionally printed object can include, for example, multiple fused composite layers including from about 80 wt % to 99.9 wt % polymer and from about 0.1 wt % to about 10 wt % triazine radiation absorber carried by the polymer. In some examples, the polymer can be white, transparent, or translucent, and in other examples, the polymer can be color-modified by a colorant so that the three-dimensionally printed object exhibits a color or tint.

It is noted that when discussing fusing agents, three-dimensional printing systems, methods for three-dimensional printing, and/or three-dimensional printed objects, these discussions can be considered applicable to other examples, whether or not they are explicitly discussed in the context of that example. Thus, for example, in discussing a fusing agent, such disclosure is also relevant to and directly supported in context of the systems and/or methods of three-dimensional printing and/or the three-dimensional printed objects, and vice versa.

It is also understood that terms used herein will have the ordinary meaning in the relevant technical field unless specified otherwise. In some instances, there are terms defined more specifically throughout the specification or included at the end of the present specification, and thus, these terms have a meaning consistent with these more specific definitions.

Fusing Agents

Fusing agents 100 as shown in FIG. 1 can include a liquid vehicle 110, which in addition to water, may include organic cosolvent, surfactant, dispersant, etc. The fusing agent in this example also includes from about 0.5 wt % to about 20 wt % triazine radiation absorber 120 solubilized in the liquid vehicle (based on a total weight of the fusing agent). In some examples, the fusing compound, e.g., triazine radiation absorber, can be present in the fusing agent at a concentration from about 0.5 wt % to about 10 wt %, from about 0.5 wt % to about 8 wt %, from about 0.5 wt % to about 5 wt %, from about 1 wt % to about 10 wt %, or from about 2 wt % to about 20 wt %, for example.

The triazine radiation absorber 120 can be a 1,3,5-triazine derivative, for example, and can be partially solubilized or fully solubilized in the liquid vehicle of the fusing agent. In some instances, the addition of surfactant can assist with solubilizing the triazine radiation absorber. The solubilized content can be from about 0.5 wt % to about 20 wt %, for example. In further detail, the fusing agent can exhibit an absorbance from about 0.3 to 2 at a wavelength from about 300 nm to about 500 nm, an absorbance from about 0.3 to 2 at a wavelength from about 340 nm to about 400 nm, an absorbance from about 0.5 to 1.5 at a wavelength from about 340 nm to about 400 nm, an absorbance from about 0.3 to about 2 at a wavelength from about 355 nm to about 385 nm, an absorbance from about 0.3 to about 0.8 at a wavelength from about 340 nm to about 400 nm or an absorbance from about 0.3 to 1 at a wavelength from about 355 nm to about 385 nm. The peak absorbance for the fusing agent may or may not be within these wavelength ranges. For example, if the peak absorbance for these fusing agents is outside of these wavelength ranges, the absorbance within these ranges may still be sufficient, e.g., absorbance ranging from about 0.3 to about 2, from about 0.5 to about 1.5, from about 0.3 to about 1, or from about 0.3 to about 0.8, to enhance the temperature of a build material sufficient to fuse the build material to form the three dimensional object. For clarity and by way of example, when referring to an absorbance from about 0.3 to about 0.8 at a wavelength from about 340 nm to about 400 nm, what is meant is that from about 16% and 50% of incoming radiation at a wavelength within the spectral range 340 nm to 400 nm is absorbed.

The triazine radiation absorber 120 can provide radiation absorbing capability to receive electromagnetic radiation with emission within the range of about 345 nm to about 415 nm in most instances, but in other examples, from about 355 nm to about 405 nm or from about 355 nm to about 385 nm. The emission within this wavelength range can include the peak emission in some examples, but in other examples, the peak emission of electromagnetic radiation may be outside of these ranges, but there is enough shoulder within these ranges to promote build material fusion. Thus, exposure to appropriate energy levels and wavelengths of electromagnetic radiation causes the triazine radiation absorber to become heated, providing a sufficient temperature boost to cause the polymeric particles of the build material to become heat melted or fused. For example, by application of electromagnetic radiation within one of these ranges at an energy level from about 2 $W/cm^2$ to about 50 $W/cm^2$ with and an irradiation application time (or dwell time) from of about 0.05 second to about 10 seconds, the polymeric particles of the build material can be sufficiently heated to cause intra-layer heat fusion as well as inter-layer fusion (from layer to layer), such as by the melting together of particles and layers.

The triazine radiation absorber 120 can be a triazine derivative compound selected from 2,4-bis(2,4-dimethylphenyl)-6-(2-hydroxy-4-octyloxyphenyl)-1,3,5-triazine, 2,4-bis(2,4-dimethylphenyl)-6-(2-hydroxy-4-isooctyloxyphenyl)-1,3,5-triazine, 2,4-bis(2,4-dimethyl phenyl)-6-(2-hydroxy-4-methoxy phenyl)1,3,5-triazine, 2-(2-hydroxy-4-hexyloxyphenyl)-4,6-bis(phenyl)-1,35-triazine, 2-(2-hydroxy-4-methoxyphenyl)-4,6-bis(phenyl)-1,3,5-triazine, 2,4-bis(2-hydroxy-4-methoxyphenyl)-6-ethyl mercaptan-1,3,5-triazine, and 2,2'-[6-(4-methoxyphenyl)-1,3,5-triazine-2,4-diyl]bis{5-[(2-ethylhexyl)oxy]phenol}, or a combination thereof.

Triazines, e.g., triazine derivatives, can be useful in examples where there may be skin contact and/or medical applications, because it is skin safe. Furthermore, triazines can also act to minimize some of the negative crystallization impact that inorganic dyes sometimes pose and can promote good print reliability. The colorless nature of this class of materials can also enable the printing of white, transparent, or translucent three-dimensional objects, and may also provide a good starting coloration (or lack thereof) for introducing multi-colored parts with good color gamut. The presence of triazines may also provide some shielding to the damaging impact of sun exposure.

Regarding the liquid vehicle 110, the fusing agent 100 may include from about 0 wt % to about 85 wt % water, or if an aqueous liquid vehicle, from about 10 wt % to about 85% water. The liquid vehicle may also include from about 5 wt % to about 99.5 wt % organic cosolvent, but in some examples, from about 10 wt % to about 90 wt % or from about 40 wt % to about 90 wt % organic cosovlent. These weight percentages are based on a total weight of the fusing agent. The organic cosolvent can be selected from any of a number of compounds, such aliphatic alcohols and/or polyols, e.g., glycerol, propylene glycol, C2-C10 aliphatic alochols, oligoglycol, etc., lactams, ethers, esters, e.g., octyl acetate. More specific examples of organic cosolvents that can be used include, without limitation, propylene glycol; glycerol; 1,2 butanediol; 1,2-propanediol; 2,3-butanediol; 1,2-pentanediol; 2-methyl-2,4-pentanediol; 2-methyl-1,3-propanediol; triols; tetrahydrofuran; ethylene glycol dimethyl ether; ethylene glycol diethylene glycol; triethylene glycol; tripropylene glycol butyl ether; 2-pyrrolidone; 1-(2-hydroxyl)-2-pyrrolidone; or a combination thereof.

The liquid vehicle can further include from about 0.1 wt % to about 20 wt % of other liquid components based on a total weight of the fusing agent, such as surfactant, dispersant, additive that inhibits growth of harmful microorganisms, pH adjuster, buffer, viscosity modifier, sequestering compound, preservative, etc. For example, there may be from about 0.01 wt % to about 10 wt % surfactant, and from about 0.01 wt % to about 10 wt % dispersant, from about 0.01 wt % to about 4 wt % chelating compound and/or other additives, or a combination thereof.

If surfactant is included, the surfactant can include a non-ionic surfactant, a cationic surfactant, and/or an anionic surfactant. Example non-ionic surfactants can include self-emulsifiable, nonionic wetting agents based on acetylenic diol chemistry (e.g., SURFYNOL® SEF from Air Products and Chemicals, Inc., USA), a fluorosurfactant (e.g., CAPSTONE® fluorosurfactants from DuPont, USA), or a combination thereof. In other examples, the surfactant can be an ethoxylated low-foam wetting agent (e.g., SURFYNOL® 440, SURFYNOL® 465, or SURFYNOL® CT-111 from Air Products and Chemical Inc., USA), or an ethoxylated wetting agent and molecular defoamer (e.g., SURFYNOL® 420 from Air Products and Chemical Inc., USA). Still other examples of surfactants can include wetting agents and molecular defoamers (e.g., SURFYNOL® 104E from Air Products and Chemical Inc., USA), alkylphenylethoxylates, solvent-free surfactant blends (e.g., SURFYNOL® CT-211 from Air Products and Chemicals, Inc., USA), water-soluble surfactant (e.g., TERGITOL® TMN-6, TERGITOL® 15S7, and TERGITOL® 15S9 from The Dow Chemical Company, USA), or a combination thereof. In other examples, the surfactant can include a non-ionic organic surfactant (e.g., TEGO® Wet 510 from Evonik Industries AG, Germany), a non-ionic secondary alcohol ethoxylate (e.g., TERGITOL® 15-S-5, TERGITOL® 15-S-7, TERGITOL® 15-S-9, and TERGITOL® 15-S-30 all from Dow Chemical Company, USA), or a combination thereof. Example anionic surfactants can include alkyldiphenyloxide disulfonate (e.g., DOWFAX® 8390 and DOWFAX® 2A1 from The Dow Chemical Company, USA), oleth-3 phosphate surfactant (e.g., CRODAFOS™ N3 Acid from Croda, UK), and dioctyl sulfosuccinate sodium salt. Example cationic surfactant can include dodecyltrimethylammonium chloride, hexadecyldimethylammonium chloride, or a combination thereof. In some examples, the surfactant can include a co-polymerizable surfactant. Co-polymerizable surfactants can include polyoxyethylene alkylphenyl ether ammonium sulfate, sodium polyoxyethylene alkylether sulfuric ester, polyoxyethylene styrenated phenyl ether ammonium sulfate, or mixtures thereof. Other surfactants that may be used include Span and Triton surfactants. In some more specific examples, the surfactant can be a polyethylene sorbitol ester, e.g., Polysorbate 80 or Tween 80, a polyoxyethylene lauryl ether, e.g., BRIJ® 23 from Sigma-Aldrich, or a mixture thereof. In this example, the surfactant may be included at from about 0.4 wt % to about 4 wt %. In some examples, however, the surfactant (which may include a blend of multiple surfactants), the total surfactant content in the fusing agent may be from about 0.01 wt % to about 5 wt %, from about 0.05 wt % to about 2 wt %, or from about 0.01 wt % to about 1 wt %, or from about 0.4% to about 4 wt %.

Some example additives that can inhibit the growth of harmful microorganisms can include biocides, fungicides, and other microbial agents. Example antimicrobial agents can include the NUOSEPT® (Ashland Inc., USA), VANCIDE® (R. T. Vanderbilt Co., USA), ACTICIDE® B20 and ACTICIDE® M20 (Thor Chemicals, U.K.), PROXEL® GXL (Arch Chemicals, Inc., USA), BARDAC® 2250, 2280, BARQUAT® 50-65B, and CARBOQUAT® 250-T, (Lonza Ltd. Corp., Switzerland), KORDEK® MLX (The Dow Chemical Co., USA), and a combination thereof. In other examples, if included, a total amount of antimicrobial agents in the fusing agent can range from 0.01 wt % to 3 wt %.

In some examples, a liquid vehicle may further include a pH adjuster or buffer. The pH adjuster can be any compound that raises or lowers the pH when added in relative small amounts, e.g., 0.01 wt % to about 1 wt %. The buffer, if used, can be provided to withstand small changes (e.g., less than 1) in pH when small quantities of a water-soluble acid or a water-soluble base are added to a composition containing the buffer. The buffer can have a pH that can range from 5 to 9.5, from 7 to 9, or from 7.5 to 8.5. In some examples, the buffer can include a poly-hydroxy functional amine. In other examples, the buffer can include potassium hydroxide, 2-[4-(2-hydroxyethyl) piperazin-1-yl]ethane sulfonic acid, 2-amino-2-(hydroxymethyl)-1,3-propanediol (TRIZMA® sold by Sigma-Aldrich, USA), 3-morpholinopropanesulfonic acid, triethanolamine, 2-[bis-(2-hydroxyethyl)-amino]-2-hydroxymethyl propane-1,3-diol (bis tris methane), N-methyl-D-glucamine, N,N,N'N'-tetrakis-(2-hydroxyethyl)-ethylenediamine and N,N,N'N'-tetrakis-(2-hydroxypropyl)-ethylenediamine, beta-alanine, betaine, or mixtures thereof. In yet other examples, the buffer can include 2-amino-2-(hydroxymethyl)-1,3-propanediol (TRIZMA® sold by Sigma-Aldrich, USA), beta-alanine, betaine, or mixtures thereof.

In some more specific examples, the fusing agent can include from about 0.5 wt % to about 6 wt % triazine radiation absorber 120; from about 40 wt % to about 90 wt % organic cosolvent; from about 0.4 wt % to about 4 wt % of a surfactant selected from a polyethylene sorbitol ester, a polyoxyethylene lauryl ether, or a mixture thereof; and water. The polyethylene sorbitol ester can be present in one example in the form of polyoxyethylene-sorbitan-20 monooleate e.g., polysorbate 80 or TWEEN 80 from Sigma-Aldrich. The polyoxyethylene lauryl ether can be present n another example in the form of polyoxyethylene (23) lauryl ether, e.g., BRIJ® 23 from Sigma-Aldrich. In some examples, the fusing agent can exhibit an absorbance from about 0.3 to 2 at a wavelength from about 340 nm to about 400 nm.

Three-Dimensional Printing Systems

Figure 2:
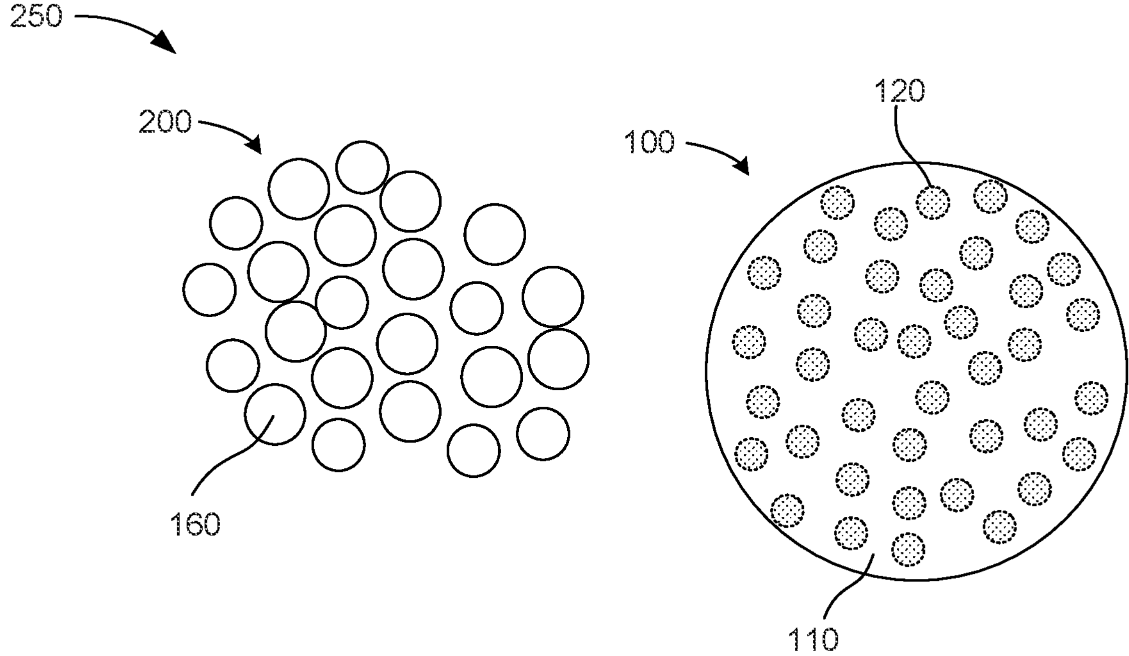
FIG. 2 schematically illustrates an example three-dimensional printing system in accordance with the present disclosure.

An example three-dimensional printing system 250 is shown in FIG. 2, which includes a fusing agent 100 as previously described in FIG. 1, and a build material 200. The build material may include from about 80 wt % to 100 wt % polymeric particles that can be selectively heat fused upon contact with the fusing agent and exposure electromagnetic radiation having a wavelength suitable for generating heat where the fusing agent has been applied to the build material. The build material can also have a D50 particle size from about 10 μm to about 150 μm. In some examples, the polymeric particles can be present at from about 90 wt % to 100 wt %, from about 95 wt % to about 100 wt %, from about 80 wt % to about 90 wt %, from about 85 wt % to about 95 wt %, or at about 100 wt %. Other particles other than the polymeric particles, if present, can be included, such as filler, charging particles, flow aid particles, etc.

The polymeric particles 160 can be selected from polyacetal, polyacrylate, polyamide, polybutylene terephthalate, polycarbonate, polyester, polyether ketone, polyethylene terephthalate, polyethylene, polypropylene, polystyrene, polyurethane, thermoplastic polyamide elastomer, thermoplastic polyurethane elastomer, or combinations thereof. In some examples, the polymeric particles can include a polyamide. The polyamide can be selected from polyamide-6, polyamide-9, polyamide-11, polyamide-12, polyamide-6,6, polyamide-6,12, thermoplastic polyamide elastomer, or a combination thereof. In other examples, the polymeric particles can include a polyacrylate, polybutylene terephthalate, polycarbonate, polyester, polyethylene, polystyrene, polyurethane, or combinations thereof. Core shell polymer particles of these materials may also be used. In some examples, the build material can exclude amorphous materials.

The polymeric particles (and other particles if present) of the build material can have a D50 particle size that can range from about 10 μm to about 150 μm. In other examples, the polymeric particles can have a D50 particle size that can range from about 10 μm to about 100 μm, from about 20 μm to about 80 μm, from about 30 μm to about 50 μm, from about 25 μm to about 75 μm, from about 40 μm to about 80 μm, from about 50 μm to about 75 μm, from about 75 μm to about 150 μm, from about 60 μm to about 90 μm, or from about 100 μm to about 150 μm, for example. The terms "size" or "particle size," as used herein, refer to the diameter of a substantially spherical particle, or the effective diameter of a non-spherical particle, e.g., the diameter of a sphere with the same mass and density as the non-spherical particle as determined by weight. Particle size information can be determined and/or verified using a scanning electron microscope (SEM), or can be measured using a particle analyzer such as a MASTERSIZER™ 3000 available from Malvern Panalytical, for example. The particle analyzer can measure particle size using laser diffraction. A laser beam can pass through a sample of particles and the angular variation in intensity of light scattered by the particles can be measured. Larger particles scatter light at smaller angles, while small particles scatter light at larger angles. The particle analyzer can then analyze the angular scattering data to calculate the size of the particles using the Mie theory of light scattering. Particle size can be reported as a volume equivalent sphere diameter. In some examples, an average particle size can refer to a mathematical average of the particle sizes, which is normally about the D50 particle size, but can be different depending on the particle size distribution.

That being stated, an example Gaussian-like distribution of the particles can be characterized generally using "D10," "D50," and "D90" particle size distribution values, where D10 refers to the particle size at the $10^{th}$ percentile, D50 refers to the particle size at the $50^{th}$ percentile, and D90 refers to the particle size at the $90^{th}$ percentile. For example, a D50 value of about 25 μm means that about 50% of the particles (by number) have a particle size greater than about 25 μm and about 50% of the particles have a particle size less than about 25 μm. Particle size distribution values are not necessarily related to Gaussian distribution curves. In practice, true Gaussian distributions are not typically present, as some skewing can be present, but still, the Gaussian-like distribution can be considered to be "Gaussian" as used in practice. Particle size distribution can be expressed in terms of D50 particle size, which can approximate average particle size, but may not be the same.

A shape of the particles of the build material can be spherical, irregular spherical, rounded, semi-rounded, discoidal, angular, subangular, cubic, cylindrical, or any combination thereof. In some examples, the particles can include spherical particles, irregular spherical particles, or rounded particles. In some examples, the shape of the particles can be uniform or substantially uniform, which can allow for relatively uniform melting of the particles.

The polymeric particles in the build material can have a melting point that can range from about 75° C. to about 350° C., from about 100° C. to about 300° C., or from about 150° C. to about 250° C. As examples, the build material can be a polyamide having a melting point of about 170° C. to about 190° C., or a thermoplastic polyurethane that can have a melting point ranging from about 100° C. to about 165° C. A variety of thermoplastic polymers with melting points or softening points in these ranges can be used. In a specific example, the build material can include polyamide particles, such as polyamide-12, which can have a melting point from about 175° C. to about 200° C. In other examples, elastomers such as thermoplastic polyamides can be used, which may have a melting point from about 135° C. to about 210° C. in some examples.

The build material may include, in addition to the polymeric particles, other particles such as filler particles, charging particles, flow aid particles, or a combination thereof. Charging particles, for example, may be added to suppress tribo-charging. Examples of suitable charging particles include aliphatic amines (which may be ethoxylated), aliphatic amides, quaternary ammonium salts (e.g., behentrimonium chloride or cocamidopropyl betaine), esters of phosphoric acid, polyethylene glycol esters, or polyols. Some suitable commercially available charging particles include HOSTASTAT® FA 38 (natural based ethoxylated alkylamine), HOSTASTAT® FE2 (fatty acid ester), and HOSTASTAT® HS 1 (alkane sulfonate), both from Clariant Int. Ltd. (North America). In other examples, if added, the charging particles can be included in an amount ranging from greater than 0 wt % to about 20 wt %, from about 0.1 wt % to about 10 wt %, or from about 0.2 to about 5 wt %, based upon the total wt % of the build material.

Flow aid particles may be added to increase the coating flowability of the build material. Flow aid particles may be particularly desirable when the particles of the build material are on the smaller end of the particle size range. The flow aid particles can increase the flowability of the build material by reducing friction, lateral drag, and tribocharge buildup (by increasing the particle conductivity). Examples of suitable flow aid particles include tricalcium phosphate (E341), powdered cellulose (E460(ii)), magnesium stearate (E470b), sodium bicarbonate (E500), sodium ferrocyanide (E535), potassium ferrocyanide (E536), calcium ferrocyanide (E533), bone phosphate (E542), sodium silicate (E550), silicon dioxide (E551), calcium silicate (E552), magnesium trisilicate (E553a), talcum powder (E553b), sodium aluminosilicate (E554), potassium aluminum silicate (E555), calcium aluminosilicate (E556), bentonite (E558), aluminum silicate (E559), stearic acid (E570), or polydimethylsiloxane (E900). In some examples, if added, the flow aid particles can be included in an amount ranging from greater than 0 wt % to about 20 wt %, from about 0.1 wt % to about 10 wt %, or from about 0.2 to about 5 wt %, based upon the total wt % of the build material.

Thus, the fusing agent 100 and the build material 200 can be used together to form three-dimensional objects. For example, the fusing agent can be applied to the build material on a layer-by-layer basis and can move into vacant spaces between particles of the build material. The fusing agent can provide binding between polymeric particles after printing of the fusing agent and exposure to electromagnetic energy within the absorption spectrum of the triazine radiation absorber 120. The triazine radiation absorber can provide a boosting capacity sufficient to increase the temperature of the build material above the melting or softening point of the polymeric particles therein. As used herein, "temperature boosting capacity" refers to the ability of triazine radiation absorber as a fusing compound to convert electromagnetic radiation, e.g., from about 300 nm to about 500 nm, such as ultraviolet radiation, e.g., from about 340 nm to about 400 nm, into thermal energy to increase the temperature of the polymeric particles of the build material over and above the temperature of the unprinted portion of the build material. Typically, the build material can be fused together when the temperature increases to or above the melting or softening temperature of a polymer of the polymeric particles, but fusion can also occur in some instance below the melting point. As used herein, "melting point" refers to a temperature at which a polymer transitions from a crystalline phase to a pliable, amorphous phase. Some polymers do not have a melting point, but rather have a range of temperatures over which the polymers soften. This range can be segregated into a lower softening range, a middle softening range, and an upper softening range. In the lower and middle softening ranges, the polymeric particles in contact with the triazine radiation absorber can coalesce to form a layer of a three-dimensional part while the remaining polymeric particles can remain loose.

As used herein, "peak absorption" indicates that from about 15% to about 100% of light emitted at a specified wavelength range is absorbed by the triazine radiation absorber. In other examples, at least about 50%, at least about 70%, at least about 80%, at least about 90%, at least about 95%, or 100% of the light emitted at the wavelengths emitted by an energy source can be absorbed by the triazine radiation absorber. The triazine radiation absorber can exhibit absorption at other wavelengths outside of this range, but the triazine radiation absorber will exhibit strong absorption (and in some instances an absorption peak) from about 50% to 100% absorption within the range of about 350 nm to about 415 nm, and the absorption is sufficient to cause the polymeric particles of the build material to become intra-layer and inter-layer heat-fused to form a multi-layered three-dimensional object. In further detail, when fusing the build material, a certain minimum amount of radiation ($J/cm^2/sec$) can be used to cause fusing. Whether that amount comes from 20% or 80% or 100% of the incoming radiation that is absorbed (e.g., such as from inherent material absorption subtracting reflection, etc.), as long as there is enough radiation used, fusing can occur. The term "fuse" or "fusing" when referring to the build material indicates that polymeric particles are fully or partially melted together so that that they become joined, and thus upon cooling, the three-dimensional printed objects formed are in the form of a monolithic mass polymer (whether the particles were fully melted or partially melted and joined at their surfaces). Furthermore, as triazine radiation absorber are used as the fusing compound in the fusing agent, the triazine radiation absorber are dispersed within the monolithic mass of the three-dimensional printed object in accordance with examples of the present disclosure. The term "fusing agent" should not be confused with a description of "fusing" of the polymeric particles. For example, the fusing agent containing triazine radiation absorber is used to absorb electromagnetic energy and convert that energy to heat so that at locations where it is applied to layers of the build material, the polymer particles can become fused, e.g., melted, together.

As used herein, "absorbance" indicates the capacity of the triazine radiation absorber to absorb light, and can be measured using a UV-visible spectrophotometer such as Cary 5000 spectrometer, for example. In some examples, the triazine radiation absorber can have an absorbance from about 0.3 to about 2, from about 0.5 to about 1.5, from about 0.3 to about 1, etc. This range can depend on the triazine radiation absorber (or absorber) concentration in the fusing agent. To illustrate, at a concentration of about 0.5 wt % to about 20 wt % triazine radiation absorber in the fusing agent, a 0.3 and 0.8 absorbance represents an absorbance range that can be reasonably achieved based on about 40% reflected energy to 12% reflected energy, resulting in enough heat to heat-fuse polymeric particles of the build material.

The three-dimensional printing system can include additional fluids or agents, such as coloring agents to impart color, detailing agents to provide more detailed printing at the border of the three-dimensional printed object, or the like. A coloring agent, if present, can include a liquid vehicle similar to that used in the fusing agent and a colorant, such as a pigment and/or a dye. As the printed three-dimensional parts of the present disclosure can be white, transparent, or translucent after fusion, a coloring agent can be used with good success in providing color, even multi-colored portions, to the three-dimensional object. White coloration (or lack of coloration) or pale coloration can be achieved in some examples of the present disclosure when white polymeric particles are selected for use with the build material and when an essentially colorless fusing agent is used with electromagnetic radiation absorption in the UV range in particular. Transparent or transparent appearance can likewise be achieved, depending on the polymeric particles used.

The detailing agent, on the other hand, can include a detailing compound. The detailing compound can reduce a temperature of the build material onto which the detailing agent is applied. In some examples, the detailing agent can be printed around the edges of the portion of the powder that is printed with the fusing agent. The detailing agent can increase selectivity between the fused and unfused portions of the powder bed by reducing the temperature of the powder around the edges of the portion to be fused.

The detailing compound can be water and/or an organic cosolvent that can evaporate at the temperature of the powder bed. In some cases the powder bed can be preheated to a preheat temperature within about 10° C. to about 70° C. of the fusing temperature of the polymeric particles. Depending on the type of polymeric particles used, the preheat temperature can be in the range of about 90° C. to about 200° C. or higher. The detailing compound can be a solvent that can evaporate when it comes into contact with the powder bed at the preheat temperature, thereby cooling the printed portion of the powder bed through evaporative cooling.

In certain examples, the detailing agent can include water, cosolvents, or a combination thereof. In some examples, the detailing agent can be mostly water. For example, the detailing agent can be from about 85 wt % to 100 wt %, or from about 85 wt % to about 99 wt % water. In further examples, the detailing agent can be from about 95 wt % to 100 wt %, or from about 95 wt % to 99 wt % water.

In some examples, the detailing agent can include a cosolvent. The cosolvent can be as identified above. In other examples, cosolvents for use in the detailing agent can include xylene, methyl isobutyl ketone, 3-methoxy-3-methyl-1-butyl acetate, ethyl acetate, butyl acetate, propylene glycol monomethyl ether, ethylene glycol mono tert-butyl ether, dipropylene glycol methyl ether, diethylene glycol butyl ether, ethylene glycol monobutyl ether, 3-Methoxy-3-Methyl-1-butanol, isobutyl alcohol, 1,4-butanediol, N,N-dimethyl acetamide, and a combination thereof. The cosolvent may be present in the detailing agent at from about 1 wt % to about 15 wt %, at from about 5 wt % to about 10 wt %, at from about 1 to about 10 wt %, or from about 5 wt % to about 15 wt %.

In still further examples, the detailing agent can be substantially devoid of triazine radiation absorber or other radiation absorbers. That is, in some examples, the detailing agent can be substantially devoid of ingredients that absorb enough radiation energy to cause particles of the build material to fuse or adhere to one another. In some examples, the detailing agent can include colorants such as dyes or pigments, but in small enough amounts that the colorants do not cause the powder printed with the detailing agent to fuse when exposed to the radiation energy.

The detailing agent can also include ingredients to allow the detailing agent to be jetted by a fluid jet printhead, e.g., piezo- or thermal-printhead. In some examples, the detailing agent can include jettability imparting ingredients such as those in the fusing agent described above. These ingredients can include a liquid vehicle, surfactant, dispersant, cosolvent, biocides, viscosity modifiers, materials for pH adjustment, sequestering agents, preservatives, and so on. These ingredients can be included in any of the amounts described above.

Figure 3:
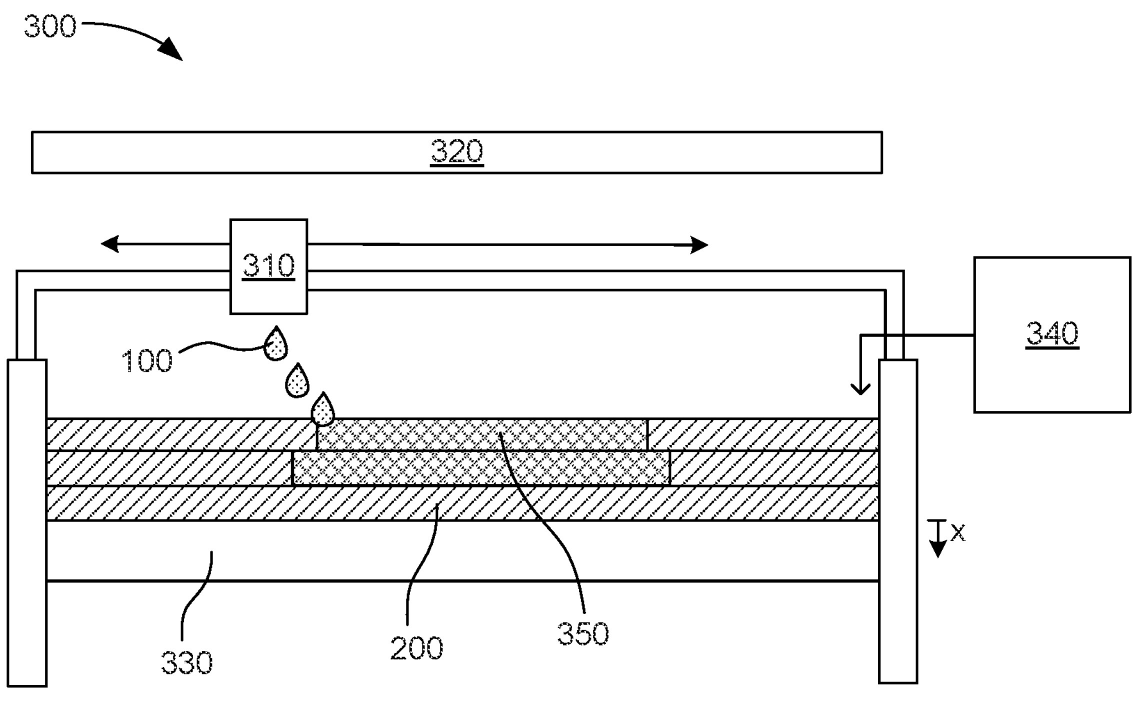
FIG. 3 schematically illustrates a more detailed example three-dimensional printing system in accordance with the present disclosure.

Turning now to FIG. 3, a more detailed illustration of a three-dimensional printing system 300 is shown, and can include a build material 200, a fusing agent 100, a fluid applicator 310, and an electromagnetic energy source 320. The build material can include from about 80 wt % to 100 wt % polymeric particles having a D50 particle size from about 10 μm to about 150 μm. The fusing agent can include a liquid vehicle and triazine radiation absorber solvated in a liquid vehicle. The build material and the fusing agent can be as described with respect to the three-dimensional printing system. The fluid applicator can be fluidly coupled to or fluidly coupleable to the fusing agent to selectively and iteratively eject the fusing agent onto successive placed individual layers of the build material. The electromagnetic energy source can be positioned to expose the individual layers of the build material to radiation energy to selectively fuse the polymeric particles in contact with the triazine radiation absorber to iteratively form a three-dimensionally printed object 350. The three-dimensional printing system can also further include a second fluid, such as a coloring agent and/or a detailing agent (not shown).

Regarding the three-dimensionally printed object, shown as partially built at 350, there can be multiple fused composite layers including from about 80 wt % to 99.9 wt % polymer and from about 0.1 wt % to about 10 wt % triazine radiation absorber carried by the polymer. In some examples, the polymer can be white, transparent, or translucent, and in other examples, the polymer can be color-modified by a colorant so that the three-dimensionally printed object exhibits a color or tint.

The fluid applicator can be any type of apparatus capable of selectively dispensing or applying a fluid agent. For example, the fluid applicator can be a fluid ejector or digital fluid ejector, such as an inkjet print head, e.g., a piezoelectric print head, a thermal print head, a continuous print head, etc. The fluid applicator could likewise be a sprayer, a dropper, a coating device, or other similar structure for applying a fluid agent to the polymeric build material. Thus, in some examples, the application can be by jetting or ejecting from a digital fluid jet applicator.

In some examples, the fluid applicator can be located on a carriage track, but could be supported by any of a number of structures. The electromagnetic energy source 320 can likewise be carried by the carriage, though in this example, the electromagnetic energy source is at a fixed location above the powder bed of build material 200. In other examples, the fluid applicator (and in some instances the electromagnetic energy source) can be operable to move back and forth to provide both x-axis and y-axis movement over the polymeric build material when positioned over or adjacent to a polymeric build material on a powder bed.

In some examples, as further illustrated in FIG. 3, the three-dimensional printing system 300 can include a build platform 330 that can support a powder bed of build material 200. The build platform can be positioned to receive the fusing agent from the fluid applicator onto the build material. The build platform can be configured to drop in height (shown at "x"), thus allowing for successive layers of build material to be applied by a spreader 340. The build material can be layered in the build platform at a thickness that can range from about 5 μm to about 1 cm. In some examples, individual layers can have a relatively uniform thickness. In some examples, a thickness of a layer of the particulate build material can range from about 10 μm to about 500 μm, from about 50 μm to about 500 μm, from about 80 μm to about 400 μm, from about 100 μm to about 350 μm, or from about 100 μm to about 300 μm.

The electromagnetic energy source can be any energy source operable to emit ultraviolet energy having a wavelength that can range from 300 nm to about 500 nm, or from about 340 nm to about 415 nm, at a sufficient energy level within one or both of these ranges to generate selective heating sufficient to heat fuse the polymeric particles of the build material 200 in contact with the fusing agent 100. These ranges may include strong absorption wavelength within these ranges, but may or may not include the peak wavelength. For example, the peak wavelength may be adjacent to this range, but still provides a shoulder emission with enough electromagnetic radiation to cause the triazine radiation absorber to generate heat sufficient to fuse the polymeric particles together. The electromagnetic energy source can be, for example, a UV LED array, fluorescent lamp emitting UV, mercury vapor lamp, high energy gas discharge lamp, UV emitting laser or laser array. In some examples, the electromagnetic energy source can be a UV LED array.

In some examples, when applied to a layer of the build material 200, the fusing agent 100 can be capable of wetting the build material through most of or all of the layer of build material, and the triazine radiation absorber can penetrate into microscopic pores of the build material layer (e.g. the spaces between the polymeric particles of the build material). The triazine radiation absorber can be activated by heating using exposure to electromagnetic radiation, including UV electromagnetic radiation in some instances. When activated, the fusing agent can form continuous network of polymer, melting the polymeric particles of the build material together to form a three-dimensional object or a printed layer of the three-dimensional object.

Three-Dimensional Printing Methods

Figure 4:
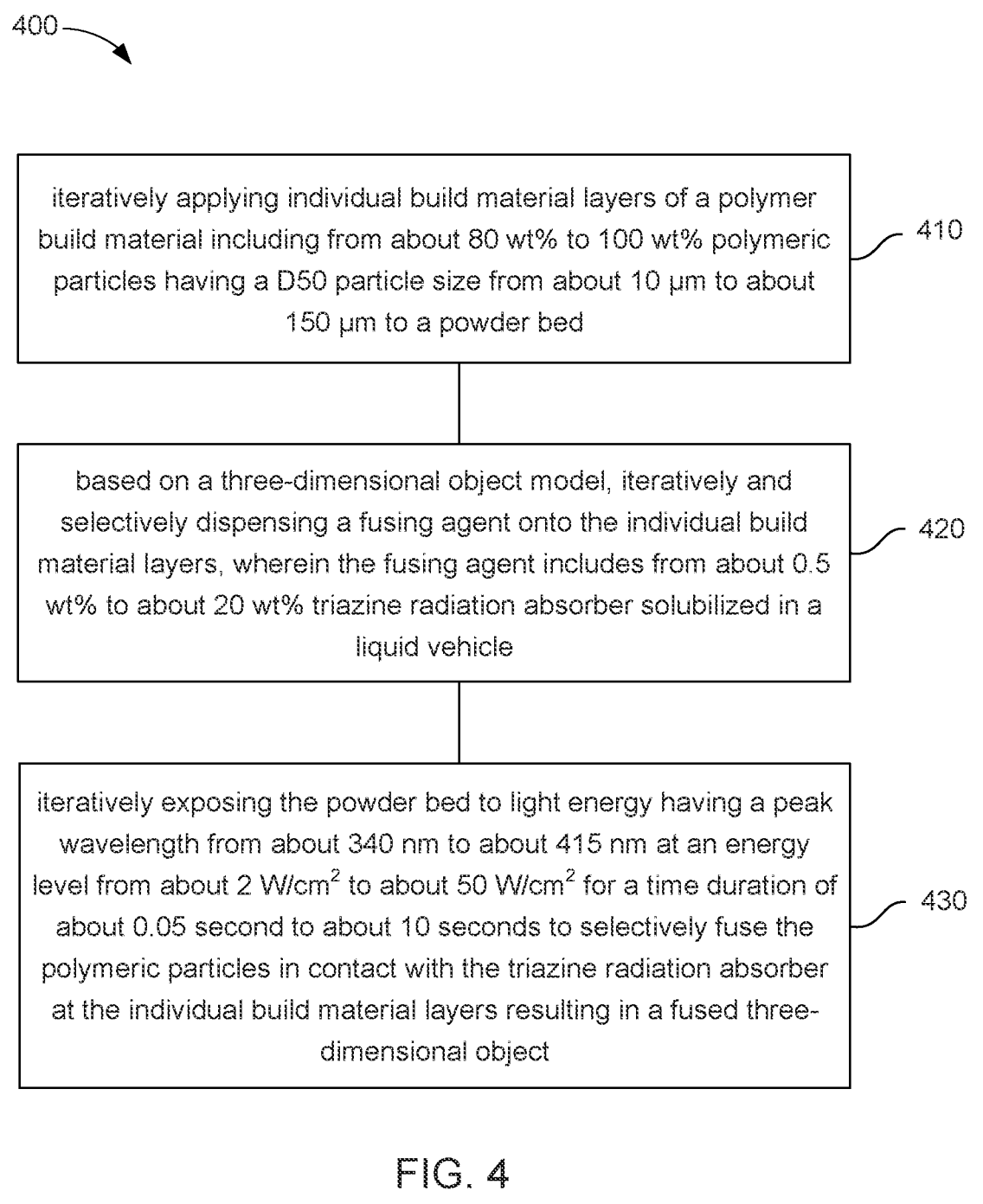

A method for three-dimensional printing is illustrated schematically at 400 in FIG. 4, and includes iteratively applying 410 individual build material layers of a polymer build material including from about 80 wt % to 100 wt % polymeric particles having a D50 particle size from about 10 μm to about 150 μm to a powder bed; and based on a three-dimensional object model, iteratively and selectively dispensing 420 a fusing agent onto the individual build material layers. The fusing agent in this example includes from about 0.5 wt % to about 20 wt % triazine radiation absorber solubilized in a liquid vehicle. The method can also include iteratively exposing 430 the powder bed to light energy having strong absorption (and in some instances an absorption peak) at a wavelength from about 340 nm to about 415 nm at an energy level from about 2 W/cm$^2$ to about 50 W/cm$^2$ for a time duration of about 0.05 second to about 10 seconds to selectively fuse the polymeric particles in contact with the triazine radiation absorber at the individual build material layers resulting in a fused three-dimensional object. The electromagnetic energy source can be used to expose the powder bed to the radiation energy and to selectively fuse portions of individual layers of the build material together to form the three-dimensional object. The electromagnetic radiation source can be a static lamp or can travel latterly by carriage along with the fluid ejectors. In some examples, the powder bed of build material can be pre-heated using thermal energy and/or other heat sources to bring the temperature of the polymeric particles near their fusion temperature, e.g., softening or melting temperature, so that the added electromagnetic radiation from the UV energy source can selectively raise the temperature of the polymeric particles in contact with the fusing agent above its fusion temperature.

In some examples, the fused three-dimensional object that is formed can be white, transparent, or translucent. Thus, the combination of white, transparent, or translucent polymeric particles and fusing agent that absorbs electromagnetic radiation in the UV range can provide for a final product that is white, transparent, or translucent. In further detail, in another example, based on the three-dimensional object model, the method can further include iteratively applying a second fluid agent to individual build material layers, such as a coloring agent that includes a liquid vehicle and a colorant or a detailing agent that includes a detailing compound that reduces a temperature of the build material onto which the detailing agent is applied. Dispensing coloring agent can be particularly useful when the three-dimensional object being formed would otherwise be white or pale in coloration, and/or transparent or translucent in appearance. Regarding detailing agent, dispensing a detailing agent onto individual layers laterally at a border between a first area of the build material contacted by the fusing agent and an area of the build material uncontacted by the fusing agent. Printing a detailing agent laterally at a border can increase the definition of the three-dimensional object at the lateral edge and can permit a formation of a smooth edge at the printed three-dimensional object.

Definitions

It is noted that, as used in this specification and the appended claims, the singular forms "a," "an," and "the" include plural referents unless the context clearly dictates otherwise.

As used herein, "liquid vehicle" refers to an admixture of liquid components used to carry active ingredients such as radiation absorber, colorant, detailing compound, etc. In some examples, the liquid vehicle is aqueous and includes water and in some examples, other components such as, surfactants, cosolvents, anti-kogation agents, buffers, biocides, sequestering agents, viscosity modifiers, surface-active agents, or the like.

As used herein, "jetting" or "jettable" refers to compositions that are ejectable from jetting architecture, such as ink-jet architecture, Ink-jet architecture can include thermal or piezo pens with printing orifices or openings suitable for ejection of small droplets of fluid. In a few examples, the fluid droplet size can be less than 10 picoliters, less than 20 picoliters, less than 30 picoliters, less than 40 picoliters, less than 50 picoliters, etc. Jetting is one methodology of applying fusing agent or other fluid agents to a build material in accordance with the present disclosure. Other applying methods can include dropping, spraying, coating, or other ways of depositing fluid agents onto build material.

As used herein, "system" can be synonymous with and understood to include a plurality of compositions including one or more components where the different compositions can be separately contained in one or more containers prior to and during use, e.g., building a three-dimensional object, but these components can be combined together during a build process. The containers can be any type of a vessel, box, or receptacle made of any material. Systems can also include structural components that work in concert with the plurality of compositions, such as fluid ejectors, electromagnetic energy sources, etc.

As used herein, the term "about" is used to provide flexibility to a numerical range endpoint by providing that a given value may be "a little above" or "a little below" the endpoint. The degree of flexibility of this term can be dictated by the particular variable and determined based on experience and the associated description herein.

As used herein, a plurality of items, structural elements, compositional elements, and/or materials may be presented in a common list for convenience. However, these lists should be construed as though members of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include individual numerical values or sub-ranges encompassed within that range as if numerical values and sub-ranges are explicitly recited. As an illustration, a numerical range of "about 1 wt % to about 5 wt %" should be interpreted to include not only the explicitly recited values of about 1 wt % to about 5 wt %, but also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

EXAMPLES

The following illustrates examples of the present disclosure. However, it is to be understood that the following are only illustrative of the application of the principles of the present disclosure. Numerous modifications and alternative compositions, methods, and systems may be devised without departing from the spirit and scope of the present disclosure. The appended claims are intended to cover such modifications and arrangements.

Example 1—Preparation of Fusing Agents

A fusing agent (Fusing Agent 1) was formulated in accordance with Table 1, as follows:

TABLE 1

| Fusing Agent 1 | | |
|---|---|---|
| Ingredient | Component Type | Wt % |
| 2,2'-[6-(4-Methoxyphenyl)-1,3,5-triazine-2,4-diyl]bis{5-[(2-ethylhexyl)oxy]phenol} (Bemotrizinol) | Triazine Radiation Absorber | 2.5 |
| Octyl Acetate, Heptanol, Ethanol, Diethylene Glycol Butyl Ether | Organic Cosolvent | 70-85 |
| polyoxyethylene-sorbitan-20 mono-oleate (Polysorbate 80) | Additives | 1 |
| DI Water | Solvent | Balance |

Fusing Agent 1 is prepared using 2.5 wt % triazine radiation absorber, which is fully solubilized in the liquid vehicle, which includes organic cosolvent, additives, and water. In addition to their function as cosolvents, the octyl acetate provided benefits of a humectant and the heptanol/ethanol were used as a bubble former. The Polysorbate 80 is used for solubilization of the 1,3,5-triazine derivative (Bemotrizinol) and to ameliorate phase separation that may otherwise occur between more polar and more non-polar solvents. Similar positive results have been achieved using BRIJ® 23, for example.

Example 2—Printing Three-Dimensional Objects

In order to test the fusing capability of Fusing Agent 1, three-dimensional objects were printed using three different polymeric particles (100 wt % polymer powder) as the build material, namely polyamide-11 (PA-11), polyamide-12 (PA-12), and thermoplastic polyamide elastomer (TPA). For the build, the fusing agent was applied at about 2 drops per pixel to individual build material layers of about 100 μm per layer, and the UV radiation applied had a peak wavelength of about 365 nm which was set at 17 $W/cm^2$. The dwell time of the UV radiation applied at the individual layers was set at about 0.5 seconds. The three different materials were heat fused at different temperatures, since their melting points are different. The area where fusing agent was applied melted into a fused part while the surrounding powder did not melt. In all three cases, the fusing agent with the triazine was able to absorb enough UV energy to efficiently fuse the build material with considerable selectivity with the powder surrounding the part. The printed three-dimensional parts also exhibited no evidence of part discoloration during the build process, leaving essentially three-dimensional printed objects that were white in color. Because the three-dimensional object was white in these examples, a coloring agent can effectively be used for multi-color coloring agent application, including the mixing of coloring agent or the application of from one to many individual colors to a surface or interior of the three-dimensional object. Similarly, in case of translucent or transparent printed objects, the presence of coloring agent did not hinder the translucency/transparency of the object while providing uniform coloration to the printed object.

What is claimed is:

1. A fusing agent for three-dimensional printing, the fusing agent comprising:
- from about 0.5 wt % to about 6 wt % of a triazine radiation absorber; and
- a liquid vehicle including:
  - from about 40 wt % to about 90 wt % of a plurality of organic cosolvents based on a total weight of the fusing agent, wherein the plurality of organic co solvents is octyl acetate, heptanol, ethanol, and diethylene glycol butyl ether;
  - from about 0.4 wt % to about 4 wt % of a surfactant based on the total weight of the fusing agent, wherein the surfactant is selected from the group consisting of a polyethylene sorbitol ester, a polyoxyethylene lauryl ether, and a mixture thereof; and
  - water.

2. The fusing agent of claim 1, wherein the surfactant is polyethylene sorbitol ester, and wherein the polyethylene sorbitol ester is polyoxyethylene-sorbitan-20 mono-oleate.

3. The fusing agent of claim 1, wherein the surfactant is polyoxyethylene lauryl ether, and wherein the polyoxyethylene lauryl ether is polyoxyethylene (23) lauryl ether.

4. The fusing agent of claim 1, wherein the fusing agent exhibits an absorbance of from about 0.3 to 2 at a wavelength from about 340 nm to about 400 nm.

5. The fusing agent of claim 1, wherein the triazine radiation absorber is a triazine derivative compound selected from the group consisting of 2,4-bis(2,4-dimethylphenyl)-6-(2-hydroxy-4-octyloxyphenyl)-1,3,5-triazine, 2,4-bis(2,4-dimethylphenyl)-6-(2-hydroxy-4-isooctyloxyphenyl)-1,3,5-triazine, 2,4-bis(2,4-dimethyl phenyl)-6-(2-hydroxy-4-methoxy phenyl) 1,3,5-triazine, 2-(2-hydroxy-4-hexyloxyphenyl)-4,6-bis(phenyl)-1,3,5-triazine, 2-(2-hydroxy-4-methoxyphenyl)-4,6-bis(phenyl)-1,3,5-triazine, 2,4-bis(2-hydroxy-4-methoxyphenyl)-6-ethyl mercaptan-1,3,5-triazine, 2,2'-[6-(4-methoxyphenyl)-1,3,5-triazine-2,4-diyl]bis{5-[(2-ethylhexyl)oxy]phenol}, and a combination thereof.

6. A three-dimensional printing system, comprising:
- a build material including from about 80 wt % to 100 wt % of polymeric particles having a D50 particle size of from about 10 μm to about 150 μm; and
- a fusing agent including:
  - from about 0.5 wt % to about 6 wt % of a triazine radiation absorber solubilized in a liquid vehicle, wherein the liquid vehicle includes:
    - from about 40 wt % to about 90 wt % of a plurality of organic cosolvents, based on a total weight of the fusing agent solution, wherein the plurality of organic cosolvents is octyl acetate, heptanol, ethanol, and diethylene glycol butyl ether;
    - from about 0.4 wt % to about 4 wt % of a surfactant, based on the total weight of the fusing agent solution, wherein the surfactant is selected from the group consisting of a polyethylene sorbitol ester, a polyoxyethylene lauryl ether, and a mixture thereof; and
    - water.

7. The three-dimensional printing system of claim 6, wherein the fusing agent exhibits an absorbance of from about 0.3 to 2 at a wavelength from about 300 nm to about 500 nm.

8. The tree-dimensional printing system of claim 6, wherein the triazine radiation absorber is a triazine derivative compound selected from the group consisting of 2,4-bis(2,4-dimethylphenyl)-6-(2-hydroxy-4-octyloxyphenyl)-1,3,5-triazine, 2,4-bis(2,4-dimethylphenyl)-6-(2-hydroxy-4-isooctyloxyphenyl)-1,3,5-triazine, 2,4-bis(2,4-dimethyl phenyl)-6-(2-hydroxy-4-methoxy phenyl) 1,3,5-triazine, 2-(2-hydroxy-4-hexyloxyphenyl)-4,6-bis(phenyl)-1,3,5-triazine, 2-(2-hydroxy-4-methoxyphenyl)-4,6-bis(phenyl)-1,3,5-triazine, 2,4-bis(2-hydroxy-4-methoxyphenyl)-6-ethyl mercaptan-1,3,5-triazine, 2,2'-[6-(4-methoxyphenyl)-1,3,5-triazine-2,4-diyl]bis {5-[(2-ethylhexyl)oxy]phenol}, and a combination thereof.

9. The three-dimensional printing system of claim 6, wherein the polymeric particles are white, transparent, or translucent.

10. The three-dimensional printing system of claim 6, wherein the polymeric particles include polyacetal, polyacrylate, polyamide, polybutylene, polybutylene terephthalate, polycarbonate, polyester, polyether ketone, polyethylene terephthalate, polyethylene, polypropylene, polystyrene, polyurethane, thermoplastic polyamide, thermoplastic polyurethane, or a combination thereof.

11. The three-dimensional printing system of claim 6, further comprising:

a coloring agent including a liquid vehicle and a colorant; or a detailing agent including a detailing compound that reduces a temperature of the build material onto which the detailing agent is applied; or both the coloring agent and the detailing agent.

12. The three-dimensional printing system of claim 6, further comprising:

a fluid ejector loaded or loadable with the fusing agent to eject the fusing agent onto a powder bed of the build material; and a UV energy source that emits a peak wavelength of from about 340 nm to about 415 nm at an energy level of from about 2 W/cm$^2$ to about 50 W/cm$^2$.

13. A method for three-dimensional printing, the method comprising:

iteratively applying individual build material layers of a polymer build material including from about 80 wt % to 100 wt % of polymeric particles having a D50 particle size of from about 10 μm to about 150 μm to a powder bed;

based on a three-dimensional object model, iteratively and selectively dispensing a fusing agent onto the individual build material layers, wherein the fusing agent includes:

from about 0.5 wt % to about 6 wt % of a triazine radiation absorber solubilized in a liquid vehicle, wherein the liquid vehicle includes;

from about 40 wt % to about 90 wt % of a plurality of organic cosolvents, based on a total weight of the fusing agent solution, wherein the plurality of organic cosolvents is octyl acetate, heptanol, ethanol, and diethylene glycol butyl ether;

from about 0.4 wt % to about 4 wt % of a surfactant based on the total weight of the fusing agent solution, wherein the surfactant is selected from the group consisting of a polyethylene sorbitol ester, a polyoxyethylene lauryl ether, and a mixture thereof; and water; and iteratively exposing the powder bed to light energy having a peak wavelength of from about 340 nm to about 415 nm at an energy level of from about 2 W/cm$^2$ to about 50 W/cm$^2$ for a time duration of from about 0.05 second to about 10 seconds to selectively fuse the polymeric particles in contact with the triazine radiation absorber at the individual build material layers resulting in a fused three-dimensional object.

14. The method of claim 13, wherein the fused three-dimensional object is white, transparent, or translucent.

15. The method of claim 13, further comprising:

iteratively applying a coloring agent to individual build material layers, wherein the coloring agent includes a liquid vehicle and a colorant; or iteratively applying a detailing agent to individual build material layers, wherein the detailing agent includes a detailing compound that reduces a temperature of the build material onto which the detailing agent is applied; or both i) iteratively applying the coloring agent and ii) iteratively applying the detailing agent.

16. A three-dimensionally printed object formed by the method of claim 13, comprising multiple fused layers including from about 80 wt % to 99.9 wt % of fused polymeric particles and from about 0.1 wt % to about 10 wt % of the triazine radiation absorber carried by the fused polymeric particles.

17. The three-dimensionally printed object of claim 16, wherein the fused polymeric particles are white, transparent, or translucent.

18. The three-dimensionally printed object of claim 16, wherein the fused polymeric particles are color-modified by a colorant so that the three-dimensionally printed object exhibits a color or tint.

19. The fusing agent of claim 1, wherein the triazine radiation absorber is fully solubilized in the liquid vehicle.

20. The fusing agent of claim 1, wherein the fusing agent consists of the triazine radiation absorber and the liquid vehicle, wherein the triazine radiation absorber is a single triazine radiation absorber.

* * * * *